United States Patent
Wada

(10) Patent No.: US 8,947,580 B2
(45) Date of Patent: Feb. 3, 2015

(54) AUTO FOCUSING APPARATUS AND CONTROL METHOD

(71) Applicant: Canon Kabushiki Kaisha, Tokyo (JP)

(72) Inventor: Akiko Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/764,838

(22) Filed: Feb. 12, 2013

(65) Prior Publication Data

US 2013/0148010 A1 Jun. 13, 2013

Related U.S. Application Data

(63) Continuation of application No. 12/836,196, filed on Jul. 14, 2010, now Pat. No. 8,395,695.

(30) Foreign Application Priority Data

Aug. 18, 2009 (JP) .................................. 2009-189579

(51) Int. Cl.
*G03B 13/00* (2006.01)
*H04N 5/232* (2006.01)
*G03B 13/36* (2006.01)
*G02B 7/36* (2006.01)

(52) U.S. Cl.
CPC ............ *H04N 5/23212* (2013.01); *G03B 13/36* (2013.01); *H04N 5/23219* (2013.01); *G02B 7/36* (2013.01)
USPC ......................................... 348/346; 348/349

(58) Field of Classification Search
USPC ................................. 348/345–353
See application file for complete search history.

(56) References Cited

U.S. PATENT DOCUMENTS 8,395,695 B2 * 3/2013 Uehara ........................ 348/349

FOREIGN PATENT DOCUMENTS

| JP | 06-046310 A | 2/1994 |
| JP | 2001-249265 A | 9/2001 |
| JP | 2004-054102 A | 2/2004 |
| JP | 2008-298943 A | 12/2008 |
| JP | 2009-069696 A | 4/2009 |
| JP | 2009-098317 A | 5/2009 |
| JP | 2009-109838 A | 5/2009 |
| JP | 2009-134330 A | 6/2009 |

OTHER PUBLICATIONS

The above references were cited in a Jun. 21, 2013 Japanese Office Action, which is enclosed without an English Translation, that issued in Japanese Patent Application No. 2009-189579.

\* cited by examiner

*Primary Examiner* — Gevell Selby
(74) *Attorney, Agent, or Firm* — Cowan, Liebowitz & Latman, P.C.

(57) ABSTRACT

The invention includes steps of setting a main area set within the frame of a photographed image signal, and a plurality of auxiliary areas each of which is smaller than the main area, selecting one or a plurality of focus detection areas from the main area and the auxiliary areas in accordance with the in-focus position of a focus lens based on the focus signals of the main area and the auxiliary areas, and controlling the focus lens to move to the in-focus position of the focus lens in the focus detection area selected in the selecting step.

9 Claims, 9 Drawing Sheets

AUTO FOCUSING APPARATUS AND CONTROL METHOD

CROSS-REFERENCE TO RELATED APPLICATIONS

This application is a continuation of application Ser. No. 12/836,196, filed Jul. 14, 2010 the entire disclosure of which is hereby incorporated by reference.

BACKGROUND OF THE INVENTION

1. Field of the Invention

The present invention relates to a focus adjustment technique for an image capturing apparatus such as an electronic still camera.

2. Description of the Related Art

Conventionally, when an autofocus (hereinafter referred to as AF) operation is performed in an electronic still camera, a video camera, or the like, a scheme has been used in which a lens position at which high-frequency components of a luminance signal obtained from an image sensor such as a CCD (Charge-Coupled Device) become maximum is determined as an in-focus position. The following scan scheme is well known as such a scheme. That is, an evaluation value (to be referred to as an AF evaluation value hereinafter) based on a high-frequency component of a luminance signal obtained from a predetermined area (to be referred to as a focus detection area hereinafter) within an image sensor is stored while driving a lens over the whole distance measurement range (a predetermined range from the closest distance to infinity). A lens position (to be referred to as a peak position hereinafter) corresponding to a local maximum value among the stored values is determined as an in-focus position. Note that the in-focus position indicates a lens position where an object is assumed to be in focus.

If the illuminance or the contrast of an object is low, since the S/N ratio lowers, an AF evaluation value randomly varies due to the influence of noise. This worsens the calculation accuracy of the peak position of the AF evaluation value. When an object (to be referred to as a main object) to be focused and a background coexist within a focus detection area, the peak position is on the far side due to the influence of the background. This situation is called background focusing.

There has been proposed the following method for suppressing the influence of a low S/N ratio. That is, a plurality of focus detection areas are set. If the level of the AF evaluation value is low, the difference between the peak positions of the focus detection areas is checked to ascertain if it satisfies a condition by falling within a predetermined range. An in-focus position is determined based on the AF evaluation values of focus detection areas which satisfy the condition. There has been provided a method of detecting a main object within an image and setting a plurality of focus detection areas for the area of the detected main object, as measures against background focusing.

For example, Japanese Patent Laid-Open No. 2000-307932 discloses the following method. A plurality of focus detection areas are set. If the difference between the maximum value and the minimum value of the AF evaluation value in each focus detection area does not fall within a predetermined threshold, whether the difference between the peak positions of the AF evaluation values of the focus detection areas falls within a predetermined range is checked. If there exist focus detection areas in which the difference between their peak positions falls within the predetermined range, the average peak position of these focus detection areas is determined as an in-focus position. Japanese Patent No. 04218720 discloses a method of setting a focus detection area in an area including part of a face and a body area, respectively, and comparing peak positions of the focus detection areas to determine an in-focus position.

In the technique disclosed in Japanese Patent Laid-Open No. 2000-307932, however, if background focusing occurs in a plurality of focus detection areas, the background may be in focus rather than a main object. Furthermore, if there are a plurality of focus detection areas in each of which a peak position randomly varies due to the influence of noise, the difference between the peak positions of the focus detection areas may fall within the predetermined range, and therefore, a position which is not, in fact, an in-focus position of the main object may be focused.

FIG. 3A is a view for explaining a method of setting focus detection areas, which has been disclosed in Japanese Patent No. 04218720. FIG. 3A shows focus detection areas $301a$, $302a$, and $303a$ which have been set for a face detection area, an area including part of a face, and a body area, respectively. As shown in FIG. 3A, background focusing occurs in all the focus detection areas $301a$ to $303a$ when the face turns away. A person in the background may be focused rather than a central person as a main object.

SUMMARY OF THE INVENTION

The present invention has been made in consideration of the above problems, and provides a technique to reduce the influence of a low S/N ratio and background focusing when the illuminance or the contrast of an object is low, thereby improving the accuracy of an in-focus position.

According to a first aspect of the present invention, there is provided an auto focusing apparatus comprising: a detection unit which detects a focus signal indicating a focus state to an object in a focus detection area set within a frame of a photographed image signal; an object information acquisition unit which acquires one or a plurality of pieces of object information within the frame based on the image signal; an extraction unit which extracts a main object as an object to be focused from the object information obtained by the object information acquisition unit; a main area setting unit which sets, in the frame, a main area as one focus detection area within an area where the main object exists; an auxiliary area setting unit which sets, around the main area, auxiliary areas as a plurality of focus detection areas each of which is smaller than the main area; a focus detection area selection unit which selects one or a plurality of focus detection areas from the main area and the auxiliary areas in accordance with an in-focus position of a focus lens based on the focus signals of the main area and the auxiliary areas; and a control unit which controls the focus lens to move to the in-focus position of the focus lens in the focus detection area selected by the focus detection area selection unit.

According to a second aspect of the present invention, there is provided a control method comprising the steps of: detecting a focus signal indicating a focus state to an object in a focus detection area set within a frame of a photographed image signal; acquiring one or a plurality of pieces of object information within the frame based on the image signal; extracting a main object as an object to be focused from the object information obtained in the acquiring step; setting, in the frame, a main area as one focus detection area within an area where the main object exists; setting, around the main area, auxiliary areas as a plurality of focus detection areas each of which is smaller than the main area; selecting one or a plurality of focus detection areas from the main area and the auxiliary areas in accordance with an in-focus position of a focus lens based on the focus signals of the main area and the auxiliary areas; and controlling the focus lens to move to the in-focus position of the focus lens in the focus detection area selected in the selecting step.

Further features of the present invention will become apparent from the following description of exemplary embodiments with reference to the attached drawings.

DESCRIPTION OF THE EMBODIMENTS

Figure 1:
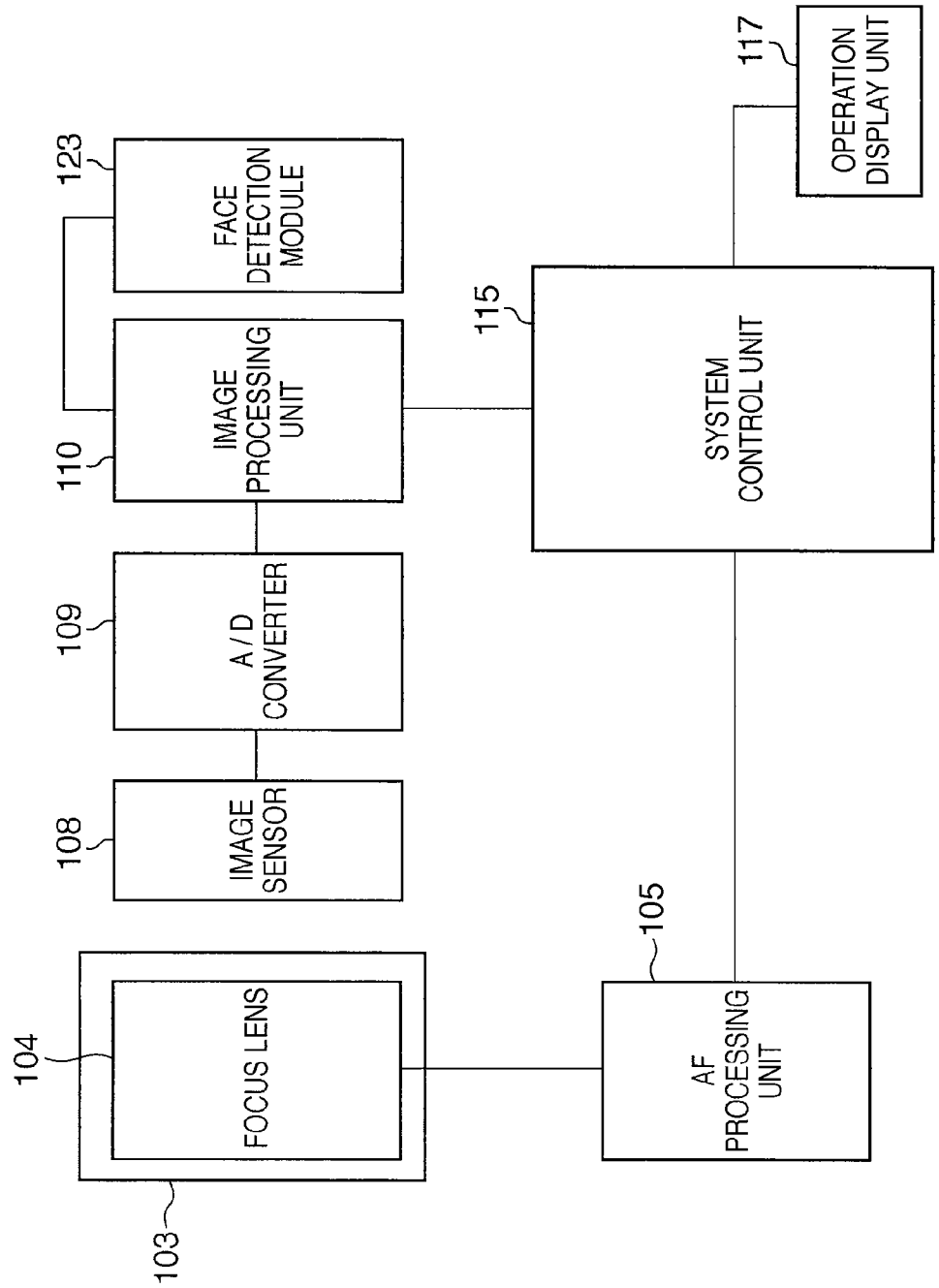
FIG. 1 is a block diagram showing the arrangement of an electronic camera according to an embodiment of the present invention.

An embodiment of the present invention will be described in detail below with reference to the accompanying drawings. FIG. 1 is a block diagram showing the arrangement of an electronic camera having an auto focusing apparatus according to the embodiment of the present invention. Referring to FIG. 1, reference numeral 103 denotes a photographing lens for forming an object image on an image sensor 108; 104, a focus lens which constitutes part of the photographing lens, and focuses on the image sensor 108; and 105, an AF processing unit. The image sensor 108 converts (photo-electrically converts) a reflected light from an object into an electric signal. Reference numeral 109 denotes an A/D converter which includes a CDS circuit for removing noise output from the image sensor 108 and a nonlinear amplification circuit for executing nonlinear amplification before A/D conversion; 110, an image processing unit; 117, an operation display unit which performs not only image display but also display for operation support and display of a camera state, and also displays a photographing frame and focus detection areas in photographing; and 123, a face detection module (object information acquisition unit) which executes face detection in an object by using an image signal processed by the image processing unit 110, and sends one or a plurality of pieces of detected face information (positions, sizes, reliabilities, face directions, and the number of detected faces) to a system control unit (to be referred to as a CPU hereinafter) 115. The face detection method does not constitute the major part of this invention, and a detailed description thereof will be omitted.

With reference to a flowchart in FIG. 2 and FIGS. 3A and 3B, AF operation in an electronic camera according to the embodiment when detecting a face will be explained. In step S201, main object determination is made based on face information (positions, sizes, and the number of detected faces) obtained from the face detection module 123, and focus detection areas are set.

Figure 3A:
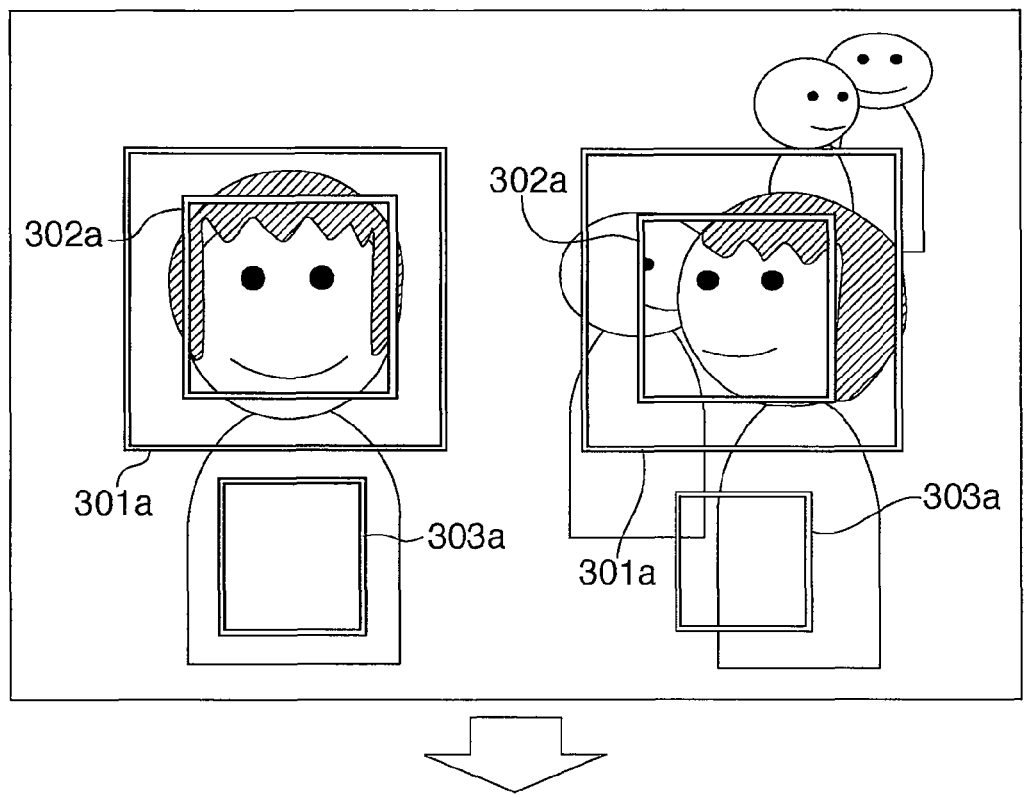
FIGS. 3A and 3B are views for explaining a method of setting focus detection areas in a prior art, and that of setting focus detection areas in the embodiment of the present invention.
Figure 3B:
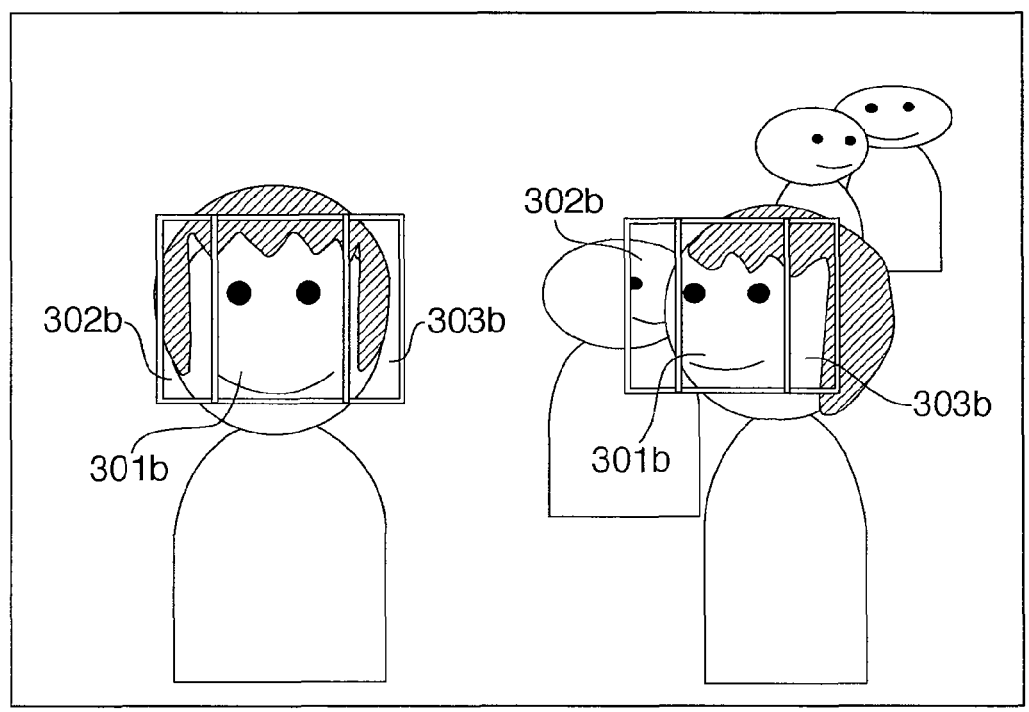

With reference to FIG. 3B, the characteristics of a focus detection area setting method in this embodiment will be described. As shown in FIG. 3B, focus detection areas are set within a face area which has been detected by the face detection module 123 in a frame, and at both sides of the face area. Assume that a focus detection area 301b set within the face area is set as a main area (main area setting), and focus detection areas 302b and 303b set at both sides of the main area (around the main area) are set as auxiliary areas (auxiliary area setting). Note that auxiliary areas may be set in the upper and lower areas of the main area instead of both sides of the main area. Since the main area 301b has been set within the face area as shown in FIG. 3B, the influence of background focusing is small even if the face turns away. As for the auxiliary areas 302b and 303b, one of them can stay within the face without background focusing, even when the face turns away. Since the auxiliary areas are set in areas with high contrast at the boundaries of the cheeks and hair, a high AF evaluation value can be obtained. If auxiliary areas are set in the upper and lower areas of the main area, focus detection areas are set within the face and body areas. This setting has an advantage that the influence of background focusing is small even if the face turns away, similarly to the main area. As described above, the focus detection area setting method shown in FIG. 3B considers background focusing, as compared with the conventional focus detection area setting method shown in FIG. 3A.

Figure 4:
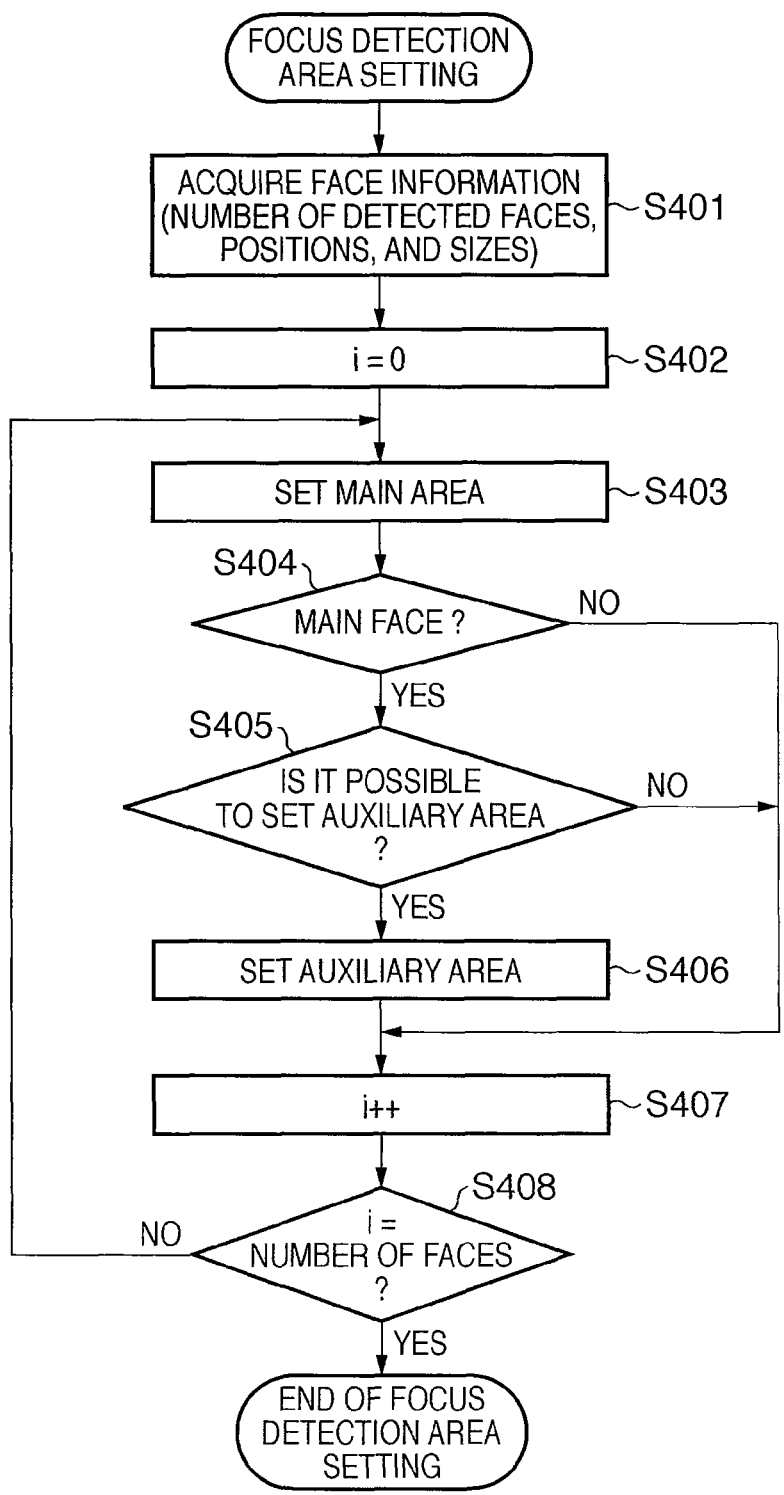
FIG. 4 is a flowchart for explaining a focus detection area setting subroutine in FIG. 2.

The procedure of step S201 will be described later with reference to FIG. 4. In step S202, an AF scan (focus detection operation) is performed in each focus detection area set in step S201, and the process advances to step S203. In the AF scan, while the focus lens 104 is moved by a predetermined amount from a scan start position to a scan end position, an AF evaluation value at each focus lens position is stored in the CPU 115. Assume that the scan start position is at infinity, and the scan end position is at the closest distance within an AF scan enable range. In step S203, peak positions (local maximum positions) of the AF evaluation values obtained in step S202 are computed (calculated), and the process advances to step S204. In step S204, focus determination (focus state determination) of the peak position of each focus detection area is made, and the process advances to step S205. The procedure of step S204 will be described later with reference to FIGS. 5 and 6. In step S205, a focus detection area for determining an in-focus position (focus detection area selection operation) is selected. The procedure of step S205 will be explained later with reference to FIG. 7. In step S206, whether a focus detection area has been selected in step S205 is checked. If a focus detection area has been selected, the process advances to step S207; otherwise, the process advances to step S209.

In step S207, the focus lens 104 is driven to the peak position of the selected focus detection area determined as an in-focus position, and the process advances to step S208. In step S208, an in-focus frame is displayed on an image display unit of the operation display unit 117, and the AF operation ends. Note that the in-focus frame is a frame indicating an in-focus area within the image area. For example, if the face is in focus, the frame is displayed in the face area. The frame is displayed in a color (for example green) indicating an in-focus state so as to readily indicate an in-focus state. In step S209, the AF processing unit 105 drives the focus lens 104 to a focus lens position (to be referred to as a face estimation position hereinafter) corresponding to the distance of the person which is estimated based on the size of the face detected by the face detection module 123, and the process advances to step S210. In step S210, an out-of-focus frame is displayed on the image display unit of the operation display unit 117, and the AF operation ends. The out-of-focus frame is a frame displayed in an area in which an object exists within the image area or a predetermined area in an out-of-focus state. A frame in a different color (for example, yellow) is set as an out-of-focus frame so as to readily indicate an out-of-focus state.

The focus detection area setting operation in step S201 of FIG. 2 will be described next with reference to a flowchart in FIG. 4. In this case, the main area and auxiliary areas shown in FIGS. 3A and 3B are set in each detected face. Assume that a face with a size equal to or larger than a predetermined one, which is closest to the center of the image area, is determined as a main face, and other detected faces are determined as sub faces. That is, among the plurality of detected faces, a face selected as a main object serves as a main face. A main area and auxiliary areas are set for the main face, and are used for determining an in-focus position. Only a main area is set for a sub face, and is not used for determining an in-focus position. However, when displaying an in-focus frame, whether the difference between a peak position in the main area of the sub face and the in-focus position falls within a predetermined range is checked. If the difference falls within the predetermined range, an in-focus frame is displayed on the area of the sub face within the image area.

In step S401, the detected face information (positions, sizes, and the number of detected faces) is acquired from the face detection module 123, and the process advances to step S402. In step S402, a variable i for counting the number of faces is initialized to 0, and the process advances to step S403. In step S403, a main area is set within the ith face based on the position and size of the face, and the process advances to step S404. In step S404, whether the ith face serves as a main face is determined. If the ith face is a main face, the process advances to step S405; otherwise, the process advances to step S407. In step S405, conditions for setting auxiliary areas are checked. If any one of the following conditions is satisfied, no auxiliary area is set.

(1) An auxiliary area is outside a focus detection enable area.

(2) An auxiliary area overlays the main area of a sub face.

The above two conditions are checked. If it is possible to set an auxiliary area, the process advances to step S406; otherwise, the process advances to step S407. In step S406, an auxiliary area is set at a predetermined position based on the setting position of the main area that has been obtained in step S405, and the process advances to step S407. In step S407, the variable i is incremented, and the process advances to step S408. In step S408, whether the variable i is equal to the number of detected faces is checked. If the check result is affirmative, the process ends; otherwise, the process returns to step S403.

The focus determination processing in step S204 of FIG. 2 will be described with reference to FIGS. 5 and 6.

Figure 5:
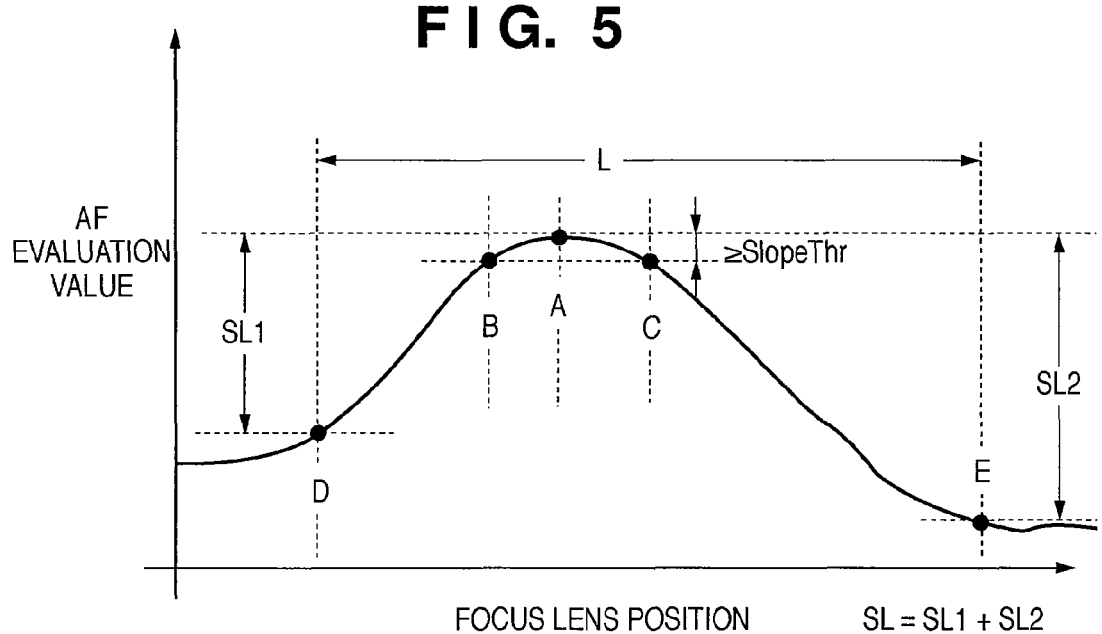
FIG. 5 is a chart for explaining a focus determination method.

In FIG. 5, the abscissa represents a focus lens position and the ordinate represents an AF evaluation value. If only one object exists within a distance range where the AF scan is executed, the AF evaluation value forms a convex shape. It is possible to execute focus determination processing by determining the convex shape based on the difference between the maximum and minimum values of the AF evaluation value, the length of a sloped part with a slope of a given value (SlopeThr) or more, and the gradient of the sloped part.

The determination result of the focus determination processing is output to represent an in-focus or out-of-focus state as follows.

in-focus state: the contrast of an object is sufficient, and the object exists at a distance within a scanned distance range.

out-of-focus state: the contrast of an object is insufficient, or the object is positioned at a distance outside a scanned distance range.

The length of the sloped part with a slope of a given value or more, and the gradient SL/L of the sloped part for determining the convex shape will be explained with reference to FIG. 5.

Points D and E to which the slope continues from the peak (point A) of the convex-shaped curve are set, and the distance between the points D and E is set as the width L of the convex-shaped curve. Assume that as long as the AF evaluation value decreases by the predetermined amount (SlopeThr) or more between neighboring scan points starting from the point A, the slope is determined to continue. The scan point indicates a point at which the AF evaluation value is acquired while the focus lens continuously moves from a scan start point to a scan end point. The sum SL1+SL2 of a difference SL1 between the AF evaluation values at the points A and D and a difference SL2 between the AF evaluation values at the points A and E is set to SL.

To execute focus determination processing based on the convex shape, the following conditions are checked:

(1) whether the length L of the sloped part with a slope of a given value or more is equal to or larger than a predetermined threshold (L0);

(2) whether the average value SL/L of the gradient of the sloped part is equal to or larger than a predetermined threshold (SL0/L0); and (3) whether the difference between the maximum value (Max) and minimum value (Min) of the AF evaluation value is equal to or larger than a predetermined threshold (defmaxmin).

If the above conditions are satisfied, it is determined that the contrast of the object is sufficient and focus adjustment is possible. The predetermined values L0, SL0, and defmaxmin serve as in-focus conditions. It is possible to tighten or loosen focus determination depending on the setting of these values.

The focus determination operation in step S204 of FIG. 2 will be explained with reference to a flowchart in FIG. 6.

In step S601, the in-focus conditions are set for each focus detection area, and the process advances to step S602. In this case, lower values are set for the in-focus conditions of a main area as compared with those for the in-focus conditions of an auxiliary area, so that the main area is more readily determined to be in a focus state. This is done to preferentially select the peak position of the main area as an in-focus position because background focusing has less influence on the main area. If, as described above, the influence of background focusing or noise is small, and the peak position highly likely serves as a position where an object is in focus, the peak position is determined to have "sufficient reliability" as an in-focus position.

In step S602, whether the AF evaluation value of each focus detection area satisfies the above-mentioned in-focus conditions is checked. If the result is affirmative, a focus state is determined; otherwise, an out-of-focus state is determined. The process then advances to step S603, in which whether the focus determination processing ends for all focus detection areas is checked. If there exists a focus detection area that has not been subjected to the focus determination processing, the process returns to step S602; otherwise, the process ends.

Figure 7:
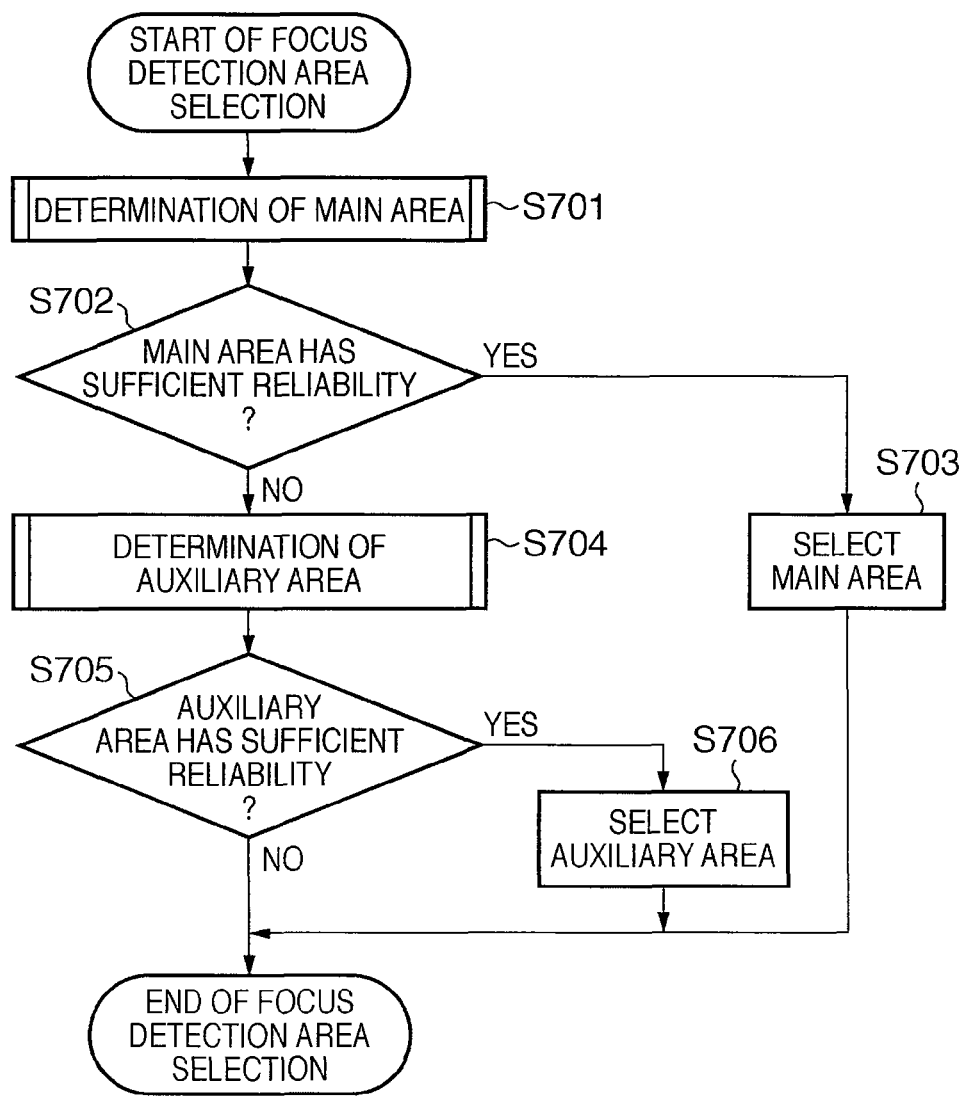
FIG. 7 is a flowchart for explaining a focus detection area selection subroutine in FIG. 2.

The focus detection area selection operation in step S205 of FIG. 2 will be described with reference to a flowchart in FIG. 7. A focus detection area whose peak position has sufficient reliability as an in-focus position is selected from the focus detection areas. Assume that a main area is less influenced by background focusing, and has more sufficient reliability as an in-focus position, as compared with an auxiliary area. Therefore, determination of the main area is made first. If it is not possible to determine the main area to have sufficient reliability, determination of an the auxiliary area is made.

In step S701, the reliability of the main area is determined. Whether the peak position of the main area has sufficient reliability as an in-focus position is checked, and the process advances to step S702. The procedure of determining the reliability of the main area in step S701 will be explained later using FIG. 8. In step S702, whether, as a result of determination of the main area in step S701, the main area has been determined to have sufficient reliability is checked. If the result is affirmative, the process advances to step S703; otherwise, the process advances to step S704. In step S703, the main area is selected as a focus detection area for determining an in-focus position, and the process ends. In step S704, whether the peak position of the auxiliary area has sufficient reliability as an in-focus position is determined, and the process advances to step S705. The procedure of determining the reliability of the auxiliary area in step S704 will be described later with reference to FIG. 10. In step S705, if, as a result of determination of the auxiliary area in step S704, the auxiliary area having sufficient reliability exists, the process advances to step S706; otherwise, the process ends. In step S706, the auxiliary area which has been determined to have sufficient reliability is selected, and then the process ends.

Figure 8:
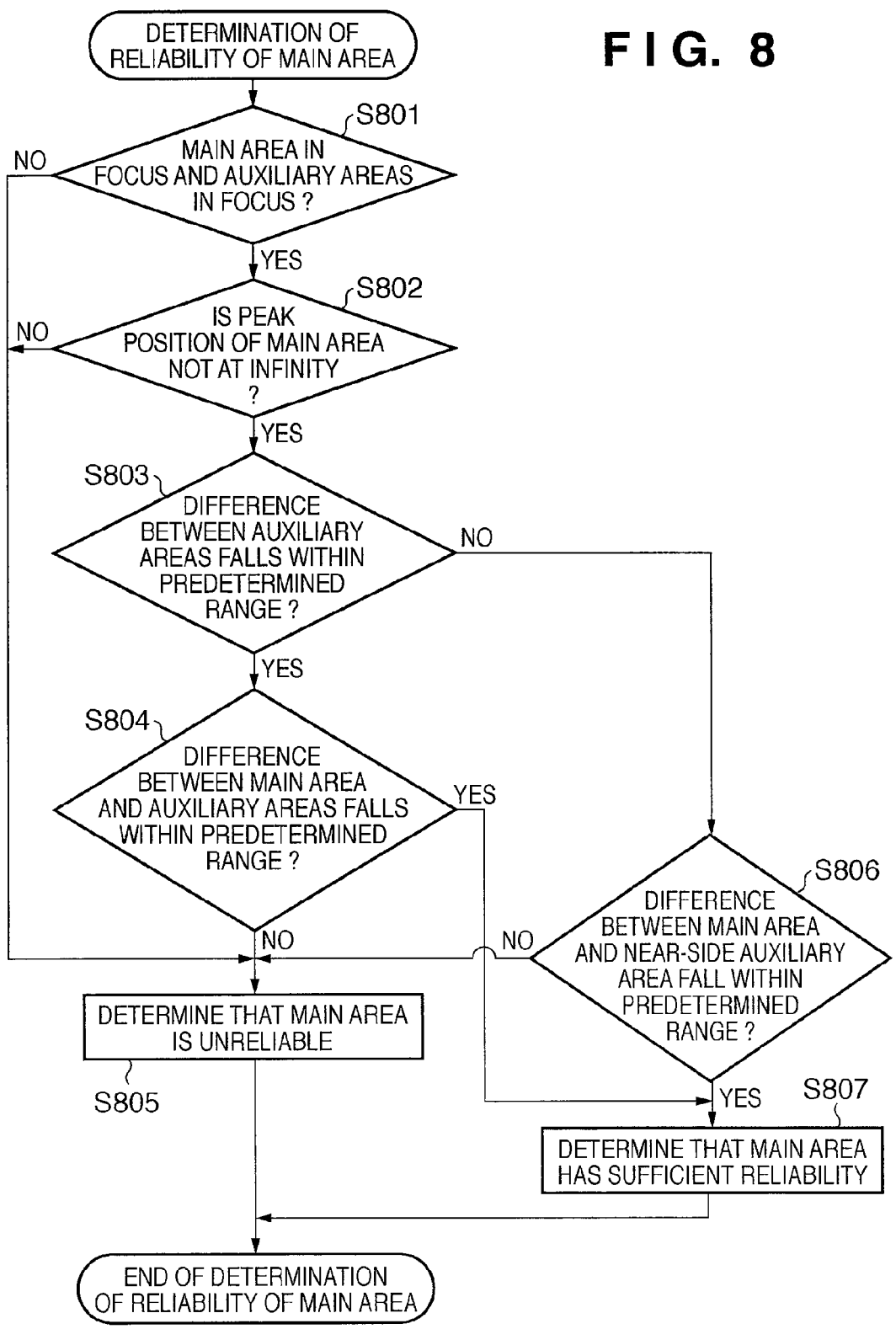
FIG. 8 is a flowchart for explaining a main area reliability determination subroutine in FIG. 7.

The main area reliability determination operation in step S701 of FIG. 7 will be explained with reference to FIG. 8. In this operation, with reference to peak positions of the main area and auxiliary areas, whether the peak position of the main area has sufficient reliability as an in-focus position is determined.

Figure 6:
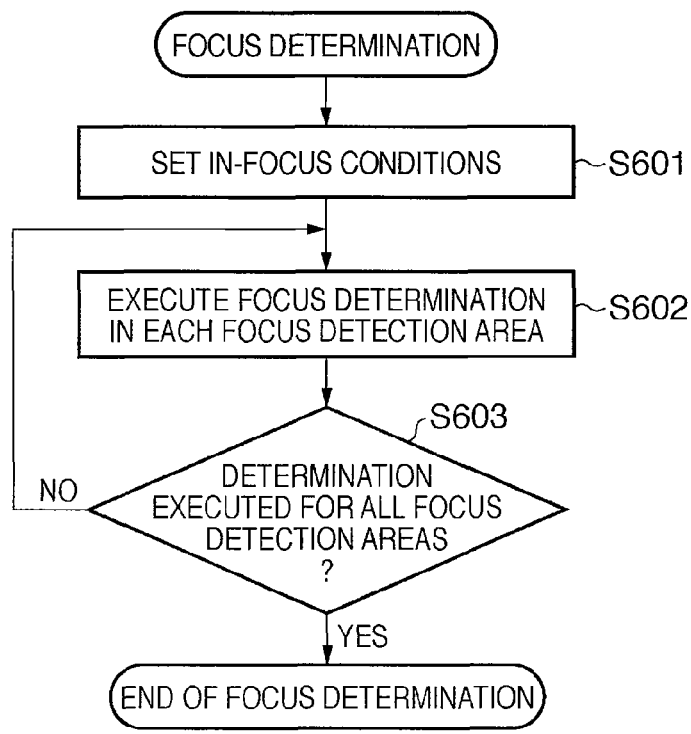
FIG. 6 is a flowchart for explaining a focus determination subroutine in FIG. 2.

In step S801, whether the main area and auxiliary areas have been determined to be in focus in the focus determination processing in step S602 of FIG. 6 is checked. If the result is affirmative, the process advances to step S802; otherwise, the process advances to step S805. In step S802, whether the peak position of the main area is at infinity is determined. If the result is affirmative, the process advances to step S805; otherwise, the process advances to step S803. Assume that the in-focus position of a face is at a finite position. If the peak position of the main area is at infinity, therefore, the main area is considered to be unreliable as an in-focus position.

In step S803, whether the difference between the peak positions of the auxiliary areas falls within a predetermined range is checked. If the result is affirmative, the process advances to step S804; otherwise, the process advances to step S806. A case in which the difference between the peak positions of the focus detection areas falls within the predetermined range assumes that a variation in peak position of the focus detection areas falls within an in-focus range. In this embodiment, assume that the predetermined range is 1.5 times the depth of focus which serves as a range around the focus considered to be in focus.

Figure 9A:
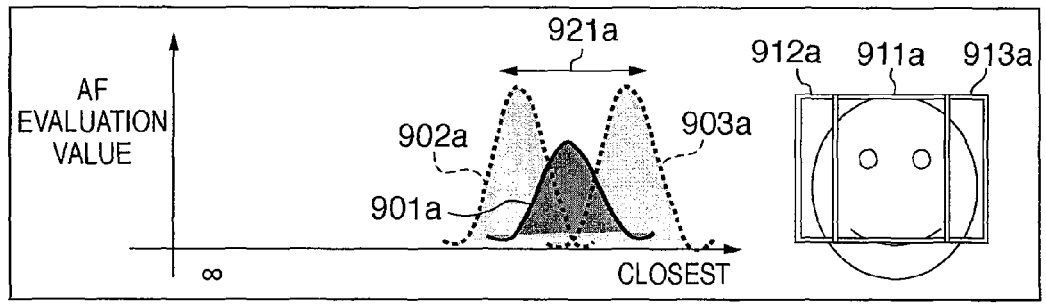
FIGS. 9A to 9D are charts for explaining reliability determination processing.
Figure 9B:
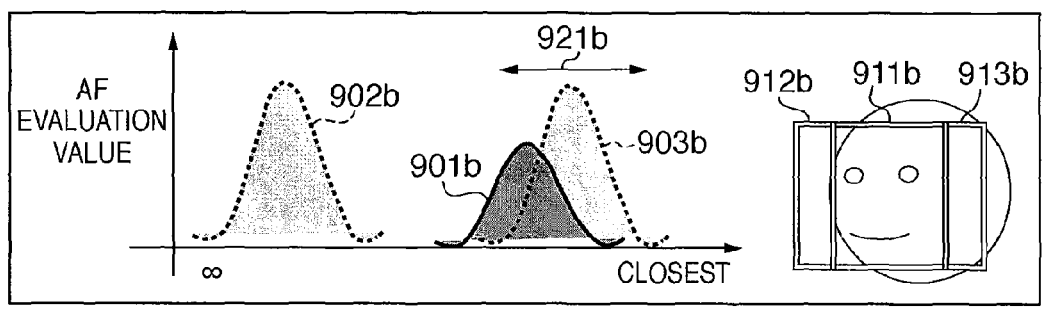
Figure 9C:
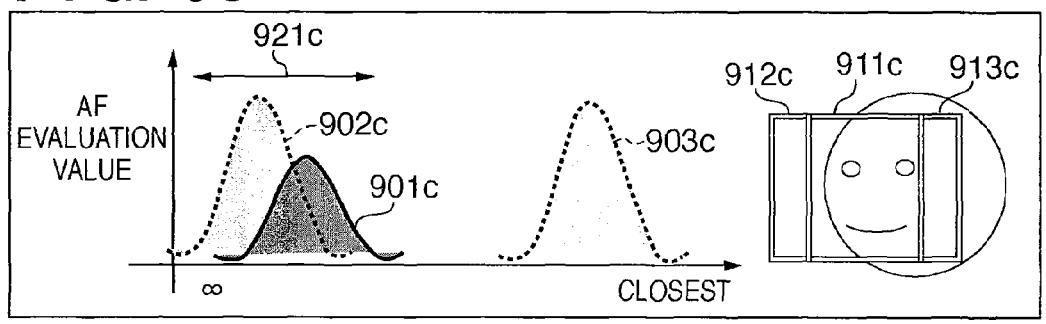
Figure 9D:
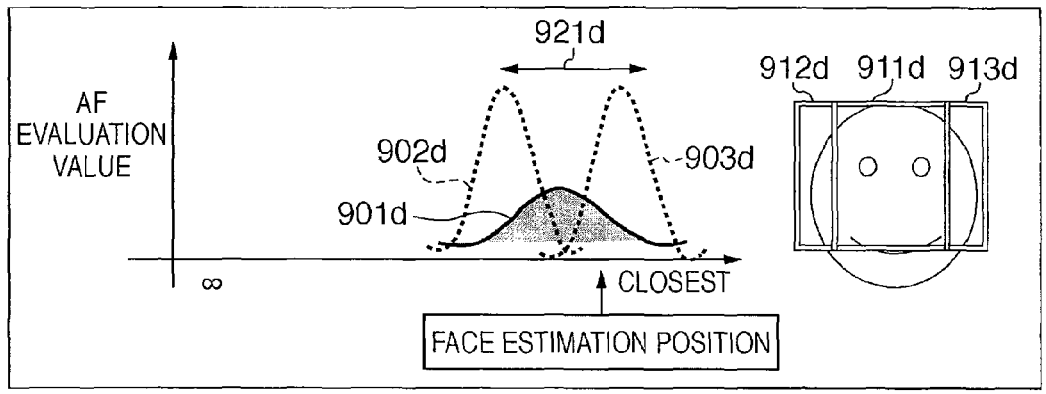

FIGS. 9A to 9D are views showing the relationships between the peak positions of the main area and auxiliary areas and assumed face directions. In the charts on the left side of FIGS. 9A to 9D, the abscissas represents a focus lens position, the ordinate represents an AF evaluation value, AF evaluation values 901a to 901d indicated by solid lines serve as the AF evaluation values of main areas, and corresponding focus detection areas are respectively represented by focus detection areas 911a to 911d on face areas shown on the right side of FIGS. 9A to 9D. Furthermore, AF evaluation values 902a to 902d and 903a to 903d indicated by dotted lines serve as the AF evaluation values of auxiliary areas, and corresponding focus detection areas are represented by focus detection areas 912a to 912d and 913a to 913d shown on the right side of FIGS. 9A to 9D, respectively. On the left side of FIGS. 9A to 9D, each of ranges 921a to 921d indicated by double-headed arrows represents the above-described predetermined range. If the difference between the peak positions of the auxiliary areas falls within the predetermined range as shown in FIGS. 9A and 9D, the face is assumed to look straight forward; otherwise, as shown in FIGS. 9B and 9C, the face is assumed to turn away.

In step S804, whether the difference between the peak positions of the main area and auxiliary areas falls within the predetermined range is checked. If the result is affirmative, the process advances to step S807; otherwise, the process advances to step S805. A case in which the difference between the peak positions of the main area and auxiliary areas falls within the predetermined range assumes that the face looks straight forward as shown in FIG. 9A, and the peak position of each focus detection area has a value near a position where the face is in focus. A case in which the difference between the peak positions of the main area and auxiliary areas does not fall within the predetermined range assumes that background focusing occurs in both the auxiliary areas or that the peak position of the main area is incorrect due to the influence of noise. In step S805, the main area is determined to be unreliable, and then the process ends. In step S807, the main area is determined to have sufficient reliability, and then the process ends.

In step S806, whether the difference between the peak position of the main area and that of the auxiliary area (to be referred to as a near-side auxiliary area), which is on the near side, falls within the predetermined area is checked. If the result is affirmative, the process advances to step S807; otherwise, the process advances to step S805. A case in which the difference between the peak positions of the main area and near-side auxiliary area falls within the predetermined range assumes that the face turns away as shown in FIG. 9B, and background focusing occurs only in the auxiliary area whose peak position is on the far side. A case in which the difference between the peak positions of the main area and the near-side auxiliary area does not fall within the predetermined range assumes that the peak position of the main area is not at the in-focus position of the face due to the influence of background focusing or noise, as shown in FIG. 9C. In step S805, the main area is determined to be unreliable, and then the process ends. In step S807, the main area is determined to have sufficient reliability, and then the process ends.

Figure 10:
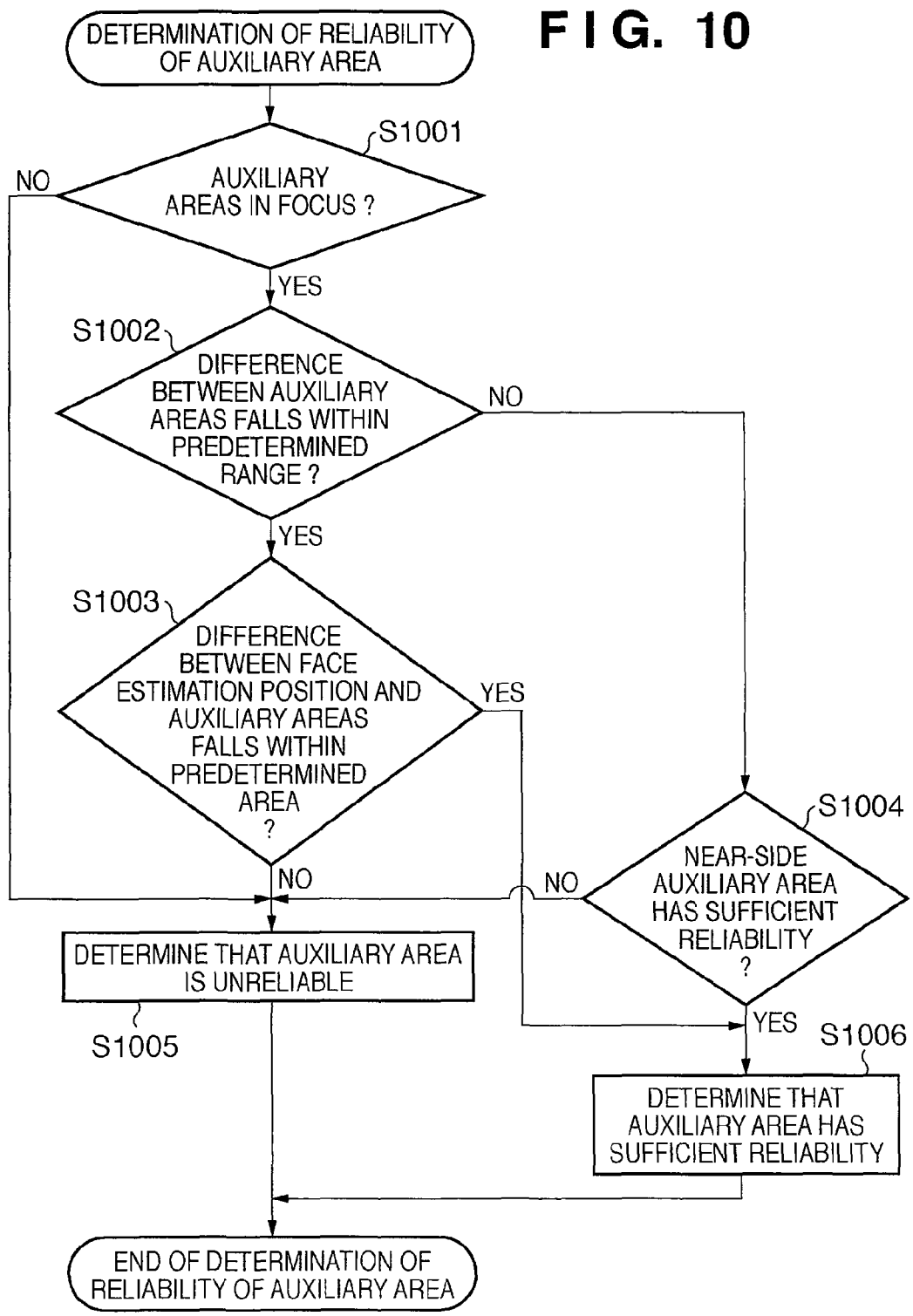
FIG. 10 is a flowchart for explaining an auxiliary area reliability determination subroutine in FIG. 7.

The auxiliary area reliability determination operation in step S704 of FIG. 7 will be described with reference to a flowchart in FIG. 10. In this operation, if the main area cannot be determined to be reliable in step S701 of FIG. 7, whether the peak position of the auxiliary area has sufficient reliability as an in-focus position is determined. If the main area cannot be determined to have sufficient reliability, it is probably because the peak position of the main area varies due to a low S/N ratio caused by noise or the influence of background focusing.

Figure 2:
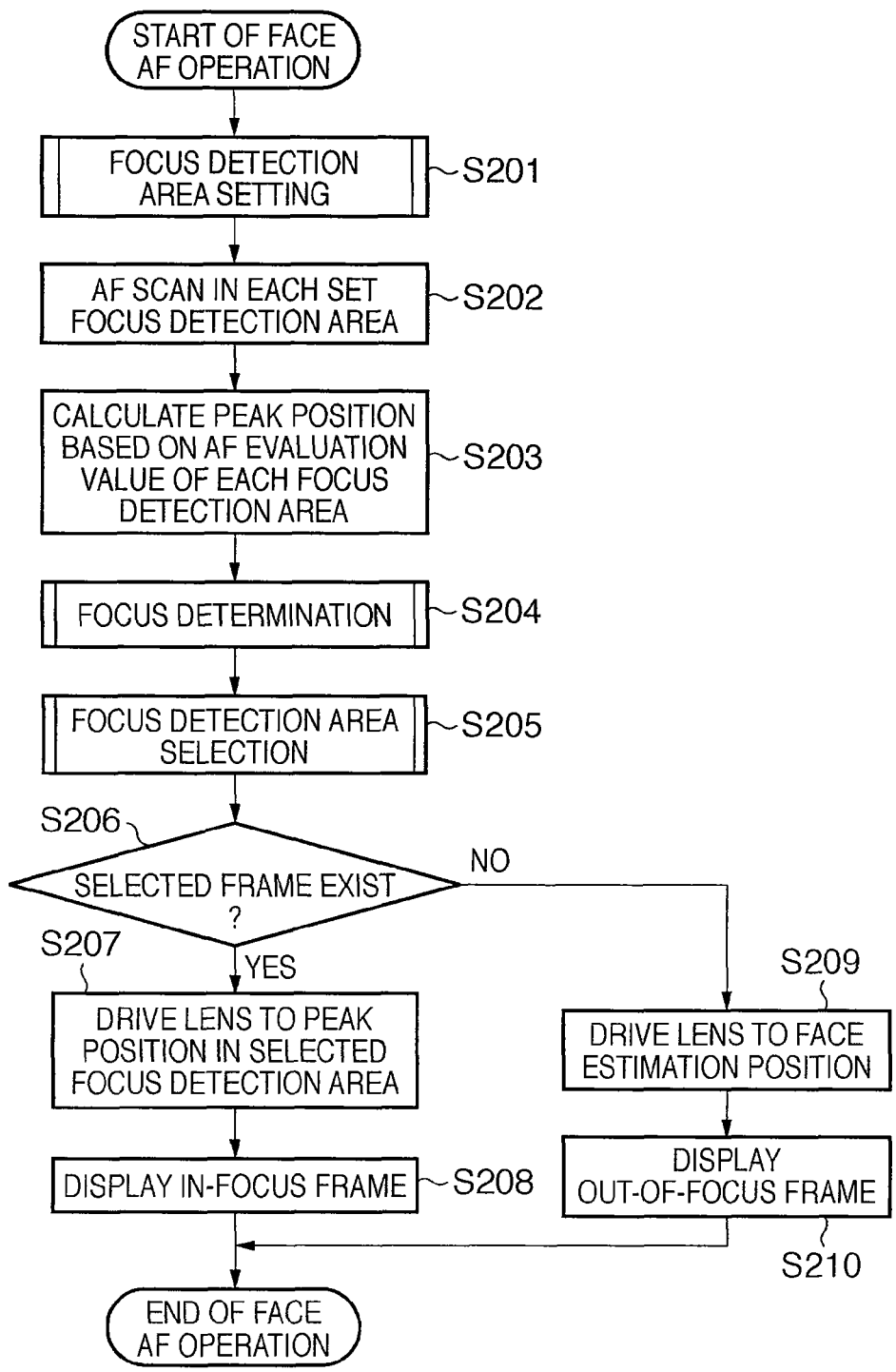
FIG. 2 is a flowchart showing AF operation in a face area in the embodiment of the present invention.

In step S1001, whether all the auxiliary areas have been determined to be in focus in the focus determination processing of step S204 in FIG. 2 is checked. If the result is affirmative, the process advances to step S1002; otherwise, the process advances to step S1005. In step S1002, whether the difference between the peak positions of the auxiliary areas falls within the predetermined range is checked. If the result is affirmative, the process advances to step S1003; otherwise, the process advances to step S1004. In step S1003, whether the difference between a face estimation position and the peak positions of the auxiliary areas falls within a predetermined range is checked. If the result is affirmative, the process advances to step S1006; otherwise, the process advances to step S1005. Note that an error in the face estimation position occurs due to detected face size variations and face size variations among individuals. In this embodiment, when it is checked whether the difference between the face estimation position and the peak positions of the auxiliary areas falls within the predetermined range, the predetermined range is set to a range which is 4 times the depth of focus, and is wider than the above-mentioned predetermined range used for checking the difference between the peak positions of the focus detection areas. When the face turns away, a detected face size is smaller than that when the face looks straight forward. The face estimation position, therefore, indicates a far-side position. In this embodiment, only if the face can be determined to highly likely to be looking straight forward, that is, the difference between the peak positions of the auxiliary areas falls within the predetermined range, the face estimation position is used, thereby improving the accuracy of reliability determination.

In step S1004, whether the near-side auxiliary area has sufficient reliability as an in-focus position is determined based on color information obtained by the image processing unit 110. If the result is affirmative, the process advances to step S1006; otherwise, the process advances to step S1005. The color information indicates the ratio of an area, which can be determined as a skin color area, to a plurality of areas into which an area within the auxiliary area (focus detection area) is divided. If the ratio of the skin color area is higher than a predetermined value, the possibility of occurrence of background focusing is low, and the auxiliary area can be determined to have sufficient reliability as an in-focus position. The reliability of the auxiliary area may be determined by using, instead of the color information, face direction information obtained by the face detection module 123. If the face turns away as shown in FIG. 3B, background focusing tends to occur in the auxiliary area 302b existing in a direction to which the face looks, and therefore, the auxiliary area cannot be determined to have sufficient reliability. On the other hand, it is high probable that the auxiliary area 303b present in the opposite direction to the face direction exists within the face, and the auxiliary area 303b can be determined to have sufficient reliability. In step S1005, the auxiliary area is determined to be unreliable, and then the process ends. In step S1006, the auxiliary area is determined to have sufficient reliability, and then the process ends.

As described above, according to the embodiment, when the AF operation is executed in a face area at the time of detecting a face, it is possible to reduce the influence of a low S/N ratio caused by noise and that of background focusing, thereby focusing on the face with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-189579, filed Aug. 18, 2009, which is hereby incorporated by reference herein in its entirety.

What is claimed is:

1. An auto focusing apparatus comprising:
 a detection unit which detects a focus signal indicating a focus state to an object in a focus detection area set within a frame of a photographed image signal;
 an object information acquisition unit which acquires one or a plurality of pieces of object information within the frame based on the image signal;
 an extraction unit which extracts a main object as an object to be focused from the object information obtained by the object information acquisition unit;
 a main area setting unit which sets, in the frame, a main area as one focus detection area within an area where the main object exists;
 an auxiliary area setting unit which sets, around the main area, auxiliary area as focus detection area for capturing a part of the area where the main object exists;
 a focus detection area selection unit which selects one or a plurality of focus detection areas from the main area and the auxiliary area in accordance with a comparing result of an in-focus position of a focus lens which is based on the focus signal in the main area and an in-focus position of the focus lens which is based on the focus signal in the auxiliary area; and
 a control unit which controls the focus lens based on the in-focus position of the focus lens in the focus detection area selected by the focus detection area selection unit.

2. The apparatus according to claim 1, wherein the focus detection area selection unit determines reliability of the in-focus positions of the focus lens in the respective focus detection areas based on the difference between the in-focus positions of the focus lens in the respective focus detection areas and selects the main area as a focus detection area used for detecting the in-focus position of the focus lens if the in-focus position of the focus lens in the main area is reliable.

3. The apparatus according to claim 1, wherein the focus detection area selection unit determines reliability of the in-focus positions of the focus lens in the respective focus detection areas based on the difference between the in-focus positions of the focus lens in the respective focus detection areas and selects the auxiliary area as a focus detection area used for detecting the in-focus position of the focus lens if the in-focus position of the focus lens in the main area is unreliable and the in-focus position of the focus lens in the auxiliary area is reliable.

4. The apparatus according to claim 1, wherein the focus detection area selection unit sets a threshold of the focus signal for determining that the in-focus position of the focus lens exists in the main area to be smaller than that of the focus signal for determining that the in-focus position of the focus lens exists in the auxiliary area.

5. The apparatus according to claim 1, wherein the focus detection area selection unit executes selection based on a difference between the in-focus position of the focus lens in each of the focus detection areas and that of the focus lens corresponding to a distance of the object which is estimated based on a size of the object obtained by the object information acquisition unit.

6. The apparatus according to claim 1, wherein the focus detection area selection unit executes selection further based on color information of the object within the focus detection area, which is obtained by the object information acquisition unit.

7. The apparatus according to claim 1, wherein the focus detection area selection unit executes selection further based on a direction of the main object detected by the object information acquisition unit.

8. A control method comprising the steps of:
   detecting a focus signal indicating a focus state to an object in a focus detection area set within a frame of a photographed image signal;
   acquiring one or a plurality of pieces of object information within the frame based on the image signal;
   extracting a main object as an object to be focused from the object information obtained in the acquiring step;
   setting, in the frame, a main area as one focus detection area within an area where the main object exists;
   setting, around the main area, auxiliary area as focus detection area for capturing a part of the area where the main object exists;
   selecting one or a plurality of focus detection areas from the main area and the auxiliary area in accordance with a comparing result of an in-focus position of a focus lens which is based on the focus signal in the main area and an in-focus position of the focus lens which is based on the focus signal in the auxiliary area; and
   controlling the focus lens based on the in-focus position of the focus lens in the focus detection area selected in the selecting step.

9. The apparatus according to claim 1, wherein the focus detection area selection unit executes selection based on a difference between the in-focus positions of the focus lens in the respective focus detection areas.

* * * * *